(12) United States Patent
Zagone

(10) Patent No.: US 12,267,580 B2
(45) Date of Patent: *Apr. 1, 2025

(54) OPERATING SYSTEM INTEGRATED IMAGE CAPTURE GUIDANCE

(71) Applicant: Wells Fargo Bank, N.A., San Francisco, CA (US)

(72) Inventor: Katherine Anne Zagone, Modesto, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/597,269

(22) Filed: Mar. 6, 2024

(65) Prior Publication Data

US 2024/0214671 A1 Jun. 27, 2024

Related U.S. Application Data

(63) Continuation of application No. 18/049,767, filed on Oct. 26, 2022, now Pat. No. 11,949,980, which is a
(Continued)

(51) Int. Cl.
*H04N 23/60* (2023.01)
*H04N 23/617* (2023.01)
(Continued)

(52) U.S. Cl.
CPC .......... *H04N 23/64* (2023.01); *H04N 23/617* (2023.01); *H04N 23/62* (2023.01); *H04N 23/631* (2023.01)

(58) Field of Classification Search
CPC .... H04N 23/64; H04N 23/617; H04N 23/631; H04N 23/62
See application file for complete search history.

(56) References Cited

U.S. PATENT DOCUMENTS 8,332,329 B1 12/2012 Thiele
8,392,332 B1 3/2013 Oakes, III et al.
(Continued)

OTHER PUBLICATIONS

"U.S. Appl. No. 16/948,991, Advisory Action mailed Dec. 2, 2021".
(Continued)

*Primary Examiner* — Kelly L Jerabek
(74) *Attorney, Agent, or Firm* — SCHWEGMAN LUNDBERG & WOESSNER, P.A.

(57) ABSTRACT

Systems and techniques for operating system integrated image capture guidance are described herein. An indication may be received of an object to be captured for completing a transaction. Configuration data may be obtained for an image of the object. The configuration data may indicate an orientation of the object in the image. An image of the object may be obtained from an imaging sensor of a device. A discrepancy may be determined between the orientation of the object in the image using the configuration data. Orientation guidance may be generated that indicates repositioning of the object in the image. It may be determined that the discrepancy between the orientation of the object in the image has been eliminated. Capture guidance may be generated for output via the device based on a set of commands determined based on detection of an operating system executing on the device.

20 Claims, 4 Drawing Sheets

Related U.S. Application Data continuation of application No. 16/948,991, filed on Oct. 8, 2020, now Pat. No. 11,516,384.

(51) Int. Cl.
*H04N 23/62* (2023.01)
*H04N 23/63* (2023.01)

(56) References Cited

U.S. PATENT DOCUMENTS

| | | |
|---|---|---|
| 8,542,921 B1 | 9/2013 | Medina |
| 8,688,579 B1 | 4/2014 | Ethington et al. |
| 8,699,779 B1 | 4/2014 | Prasad et al. |
| 8,708,227 B1 | 4/2014 | Oakes, III et al. |
| 8,977,571 B1 | 3/2015 | Bueche, Jr. et al. |
| 9,002,749 B1 | 4/2015 | Thiele |
| 9,159,101 B1 | 10/2015 | Pollack et al. |
| 9,177,197 B1 | 11/2015 | Prasad et al. |
| 9,177,198 B1 | 11/2015 | Prasad et al. |
| 9,224,136 B1 | 12/2015 | Oakes, III et al. |
| 9,336,517 B1 | 5/2016 | Prasad et al. |
| 9,569,756 B1 | 2/2017 | Bueche, Jr. et al. |
| 9,619,789 B1 | 4/2017 | Thiele |
| 9,626,662 B1 | 4/2017 | Prasad et al. |
| 9,672,510 B2 | 6/2017 | Roach et al. |
| 9,818,090 B1 | 11/2017 | Bueche, Jr. et al. |
| 9,892,454 B1 | 2/2018 | Pollack et al. |
| 9,898,778 B1 | 2/2018 | Pollack et al. |
| 10,013,605 B1 | 7/2018 | Oakes, III et al. |
| 10,013,681 B1 | 7/2018 | Oakes, III et al. |
| 10,157,405 B1 | 12/2018 | Hopkins |
| 10,235,660 B1 | 3/2019 | Bueche, Jr. et al. |
| 10,373,136 B1 | 8/2019 | Pollack et al. |
| 10,380,993 B1 | 8/2019 | Clauer Salyers |
| 10,402,638 B1 | 9/2019 | Oakes, III et al. |
| 10,402,790 B1 | 9/2019 | Clark et al. |
| 10,460,295 B1 | 10/2019 | Oakes, III et al. |
| 10,460,381 B1 | 10/2019 | Pollack et al. |
| 10,482,432 B1 | 11/2019 | Oakes, III et al. |
| 10,521,803 B1 | 12/2019 | Dixon et al. |
| 10,521,878 B1 | 12/2019 | Medina, III |
| 10,552,810 B1 | 2/2020 | Ethington et al. |
| 10,574,879 B1 | 2/2020 | Prasad et al. |
| 10,628,674 B1 | 4/2020 | Godse |
| 10,706,466 B1 | 7/2020 | Ethington et al. |
| 10,719,815 B1 | 7/2020 | Oakes, III et al. |
| 10,726,422 B1 | 7/2020 | Buentello et al. |
| 10,748,123 B1 | 8/2020 | Thiele |
| 10,810,561 B1 | 10/2020 | Pollack et al. |
| 10,818,282 B1 | 10/2020 | Clauer Salyers |
| 10,824,303 B1 | 11/2020 | Mccauley |
| 11,516,384 B1 | 11/2022 | Zagone |
| 11,949,980 B1 * | 4/2024 | Zagone ................. H04N 23/62 |
| 2009/0173781 A1 | 7/2009 | Ramachandran |
| 2013/0155474 A1 | 6/2013 | Roach et al. |
| 2013/0258117 A1 | 10/2013 | Penov et al. |
| 2014/0032406 A1 | 1/2014 | Roach et al. |
| 2014/0240546 A1 | 8/2014 | Okamoto |
| 2018/0063482 A1 | 3/2018 | Goesnar |
| 2020/0059587 A1 | 2/2020 | Pribble et al. |
| 2020/0410761 A1 | 12/2020 | Cragg et al. |

OTHER PUBLICATIONS

"U.S. Appl. No. 16/948,991, Examiner Interview Summary mailed May 3, 2022", 2 pgs.

"U.S. Appl. No. 16/948,991, Final Office Action mailed Sep. 21, 2021".

"U.S. Appl. No. 16/948,991, Non Final Office Action mailed Jan. 13, 2022".

"U.S. Appl. No. 16/948,991, Non Final Office Action mailed Mar. 31, 2021".

"U.S. Appl. No. 16/948,991, Notice of Allowance mailed Jul. 27, 2022".

"U.S. Appl. No. 16/948,991, Response filed May 13, 2022 to Non Final Office Action mailed Jan. 13, 2022", 10 pgs.

"U.S. Appl. No. 16/948,991, Response filed Jun. 30, 2021 to Non Final Office Action mailed Mar. 31, 2021".

"U.S. Appl. No. 16/948,991, Response filed Nov. 22, 2021 to Final Office Action mailed Sep. 21, 2021".

"U.S. Appl. No. 18/049,767, Final Office Action mailed Sep. 8, 2023", 16 pgs.

"U.S. Appl. No. 18/049,767, Non Final Office Action mailed Mar. 27, 2023", 21 pgs.

"U.S. Appl. No. 18/049,767, Notice of Allowance mailed Nov. 27, 2023", 9 pgs.

"U.S. Appl. No. 18/049,767, Response filed Jun. 27, 2023 to Non Final Office Action mailed Mar. 27, 2023", 12 pgs.

"U.S. Appl. No. 18/049,767, Response filed Nov. 8, 2023 to Final Office Action mailed Sep. 8, 2023", 8 pgs.

* cited by examiner

OPERATING SYSTEM INTEGRATED IMAGE CAPTURE GUIDANCE

CROSS-REFERENCE TO RELATED APPLICATION

This application is a continuation of U.S. patent application Ser. No. 18/049,767, filed Oct. 26, 2022, which is a continuation of U.S. patent application Ser. No. 16/948,991, filed Oct. 8, 2020, now issued as U.S. Pat. No. 11,516,384, each of which are incorporated by reference herein in their entirety.

TECHNICAL FIELD

Embodiments described herein generally relate to image capture from an imaging device and, in some embodiments, more specifically to operating system integrated image capture guidance.

BACKGROUND

An imaging device may be used to capture an image of an object. The captured image may be evaluated to identify components of the object in the image. It may be desired that a particular component of the object be include in the captured image. Thus, guidance may be provided to a user of the imaging device to assist the user in aligning the imaging device to capture the component of the object.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Aligning an object with an imaging device may allow for capture of components of the object in an image. Guidance may be provided to a user of the imaging device to assist the user with proper alignment of the object with the imaging sensor. When the image is properly aligned, the image may be captured. Conventional image alignment guidance solutions require a user to click a button to capture the image. This may present a challenge for persons that have physical limitations. For example, a user with arthritis may require both hands to align the image and may not be able to simultaneously press a button.

To address this limitation with conventional image alignment, the systems and techniques discussed herein provide visual guidance to the user for alignment and provide guidance for issuing a voice commend for capturing the image. The voice command information displayed to the user is customized based on the operating system of the device that includes the imaging device. For example, the IPHONE® by Apple Inc. has a shortcut for photo that is voice activated and the guidance may provide text output of the voice activated short cut for photos to assist users in capturing the aligned image.

In an example, guidance may be provided for capturing an image of a check for deposit using a mobile device. The guidance may be issued in conjunction with an image capture application (e.g., Kofax Mobile Capture SDK by KOFAX®, etc.) to trigger the image of a check, receipt, credit card, driver's license, etc. within the image capture flow thereby creating a hands-free image capture. The systems and techniques discussed herein integrate the native functionality of mobile device voice short cuts with the image capture application to trigger the image capture in a mobile deposit with a voice command.

Figure 1:
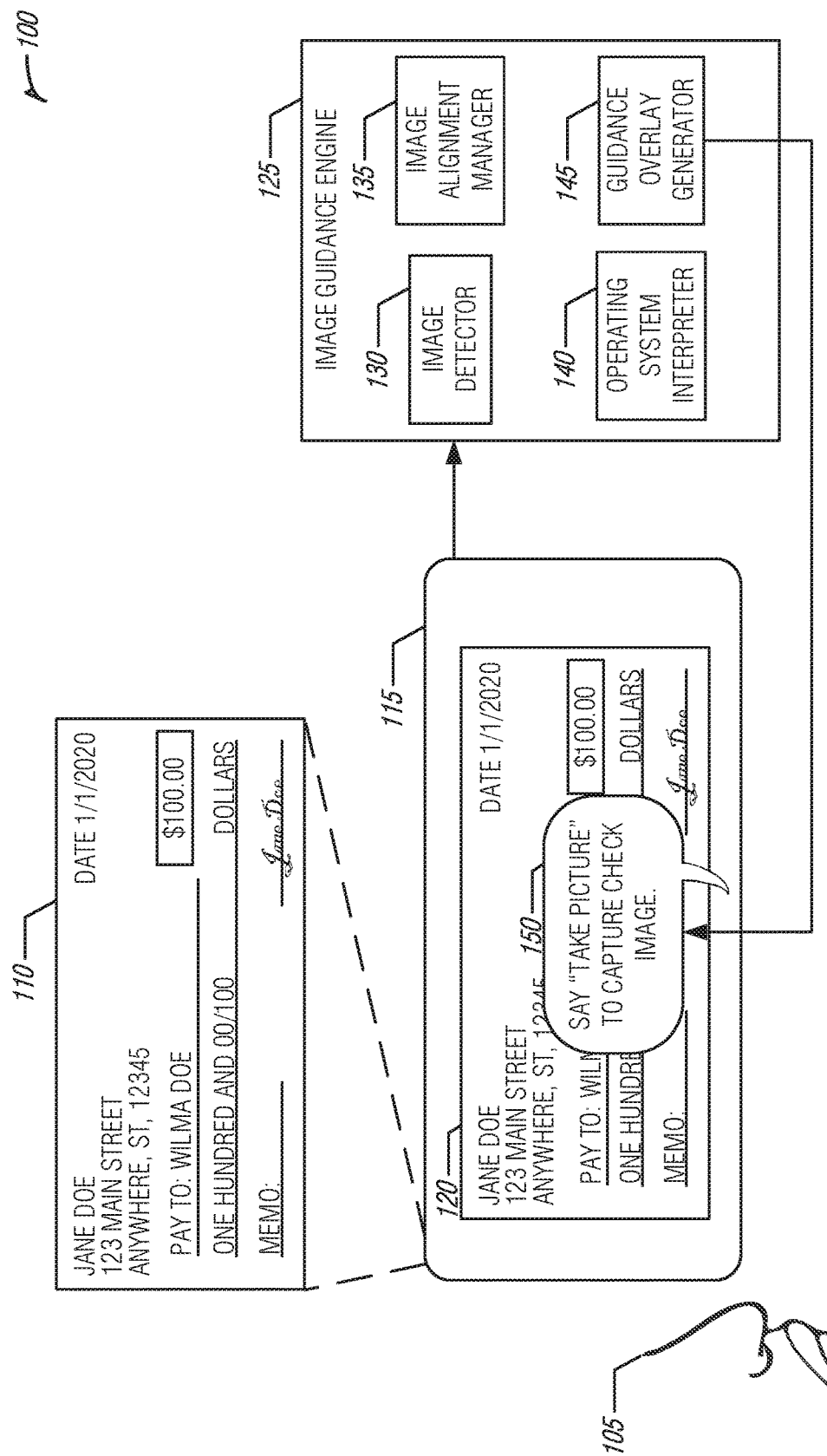
FIG. 1 is a block diagram of an example of an environment and a system for operating system integrated image capture guidance, according to an embodiment.

FIG. 1 is a block diagram of an example of an environment 100 and a system 125 for operating system integrated image capture guidance, according to an embodiment. The environment 100 may include a user 105 that may be capturing an image of an object 110 (e.g., a check, driver license, credit card, debit card, etc.) using an imaging sensor of a device 115 that is communicatively coupled (e.g., via a wired network, wireless network, shared bus, etc.) to the system 125. In an example, the system 125 may be an image guidance engine. In an example, the user 105 may use voice commands to interact with the device 115.

The system 125 may include a variety of components including an image detector 130, and image alignment manager 135, an operating system interpreter 140, and a guidance overlay generator 145. The components of the system 125 may provide guidance (e.g., visual, audio, tactile, etc.) to the user 105 for aligning and capturing an image of the object 120. For example. The user 105 may be capturing an image of a check for deposit into a financial account using a financial services software application may be installed locally on the device 115, accessed from the device 115 over a network, etc. The financial services application may request permission to access the imaging sensor and other computing resources of the device 115. The financial services application may communicate with the system 125 via the device 115 to facilitate image alignment and capture functionality from the device 115 and applications and services executing on the device 115. The financial services application may include additional functionality that may be leveraged by components of the system to facilitate image alignment and capture.

The image detector 130 may detect the presence of an object in view of the imaging sensor of the device 115. For example, the user 105 may initiate a deposit of a check and the image detector may detect apportion (or all) of a check in view of the imaging sensor. In an example, the image detector 130 may obtain a configuration data for a check deposit routine that provides parameters (e.g., object aspect ratio, colors, field layout, etc.) for an expected object image for completing the check deposit. For example, the configuration data may include a set of standard check sizes/aspect ratios, driver license sizes/aspect ratios, etc. An identification of the object and the configuration data may be provided to the image alignment manager 135.

The image alignment manager 135 may determine if the image of the object 120 is likely to be the entire (or an acceptable portion) of the object to meet requirements of the configuration data. For example, the image alignment manager 135 may determine that the left portion of the check is not present in the image of the check. For example, the image alignment manager 135 may determine that the object extends to the edge of the image, there is non-object data in the right portion of the image, and the aspect ratio has not been met.

The operating system interpreter 140 may obtain an identification of the operating system executing on the device 115 and may select a set of commands for use in communicating with the identified operating system. The operating system interpreter 145 may identify resources (e.g., operating system shortcuts, application shortcuts, voice commands, button press combinations, display properties, etc.) that are available for the identified operating system. For example, voice commands for interacting with a photo capture application provided by the detected operating system may be selected for voice activation of the photo capture application. For example, the operating system may activate image capture upon utterance of "cheese" and the cheese command may be selected for the detected operating system. In an example, the operating system interpreter 145 may initiate an initial configuration routine by prompting the user 105 for preferred commands for functions of the system 125. For example, the user 105 may be asked to speak a command to be used to capture an image. The operating system interpreter 140 may then convert the command provided by the user to commands to be provided to the operating system of the device 115 to activate image capture. For example, the user may respond to the request for a command by uttering "capture image." Capture image may then be selected as the image capture command and when future utterances of "capture image" are received, the operating system interpreter 140 may send operating system specific commands to the device 115 to activate the image capture function.

The guidance overlay generator 145 may provide guidance to the user 105 for aligning and capturing the image of the object 120. The overlay 150 may be a visual overlay, audio output, tactile output, etc. The guidance overlay generator 145 may work in conjunction with the operating system interpreter 140 to generate output configured for the output devices available in the device 115. For example, the overlay 150 may be formatted in a resolution compatible with a display device detected from the operating system of the device or may be output as audio based on the presence of an audio output device (e.g., speakers, etc.) detected from the operating system.

I an example, a constant display of a capture button may be output on a display of the device 115 to indicate a manual capture mode. To accommodate users that may have mobility impairments, the image may be captured any touch-sensitive surface of the device is activated. Thus, the guidance overlay generator 145 may present a large activation area on the device 115 that allows capture of the image regardless of where the user 105 touches the display of the device 115.

In an example, the user 105 may provide output preferences during initialization. In another example, a settings user interface may be provided to the user 105 that may receive input from the user 105 to configure output settings. This allows the user 105 to set output preferences based to address a disability of the user 105. For example, the user 105 may have a hearing impairment and the output may be specified to be provided in visual format. In another example, the user 105 may have a visual impairment and the output may be specified to be provided in audio format. In yet another example, the user may have visual and hearing impairments and the output may be specified as tactile output and a vibration feature of the device 115 may be used to provide output as a series of vibrations of the device. In an example, the guidance overlay generator 145 may work in conjunction with the operating system interpreter 140 to determine accessibility settings active on the device 115 and the output may be set based on the currently active accessibility features activated on the device 115.

The guidance overlay generator 145 may work in conjunction with the image alignment manager 135 to determine guidance to be provided to the user 105. For example, the image of the object 120 may not include the entire object 110 as the object 110 runs off the left side of the image of the object 120. The guidance overlay generator 145 may provide visual, audio, or tactile output indicating that the device 115 should be moved to the left or the object 110 should be moved to the right. This may be presented as the overlay 150, audio instructions, or a series of vibrations, etc. indicating that the object 110 is not properly aligned in the image of the object 120.

When the image of the object 120 is determined to include an adequate representation of the object 110, the guidance overlay generator 145 may output guidance that provides instructions for activating image capture. For example, the overlay 150 may indicate the user 105 should say "take picture." In an example, the overlay may be text, color, icons, etc. An utterance of the user may be passed directly to the operating system of the device 115 if the command is native (e.g., default, etc.) to the operating system of the device 115 or may be converted to operating system commands by the operating system interpreter 140 that are then transmitted to the operating system of the device 115. For example, the user may utter "capture image" which may not be a native command of the operating system of the device 115 and the operating system interpreter 140 may transmit operating system specific commands to the operating system of the device 115 to initiate image capture.

In an example, a series of images may be captured to complete a transaction. For example, a series of documents may be captured to initiate an account application and the image alignment and capture process may be repeated for each image to be captured to complete the application. For example, the guidance overlay generator 145 may output an indication of a requested image, guidance for aligning the image, and guidance for capturing the image. When the image is successfully captured, guidance may be provided for the next image to be captured. In another example, the user 105 may be able to scan a document of unknown length and guidance may be provided for aligning and capturing images until the user indicates the end of the file has been reached.

These features provide a highly adaptable image capture solution for assisting persons that may experience barriers to using conventional image capture solutions for completing transactions. While the examples used herein generally describe financial transactions, the systems and techniques are adaptable to a variety of scenarios where accurately aligned images may be desirable. For example, the systems and techniques may be used in video conferencing for assisting the user 105 in aligning a camera so that the user appears fully within the view of the camera, in taking self-photographs (e.g., "selfies", etc.) where the user 105 may wish to appear fully within the frame of the image, contactless information exchanges in which the alignment of images of object may be desirable, contactless service calls where proper alignment of an image of a part may be beneficial to diagnosis of an issue during troubleshooting, etc.

Figure 2:
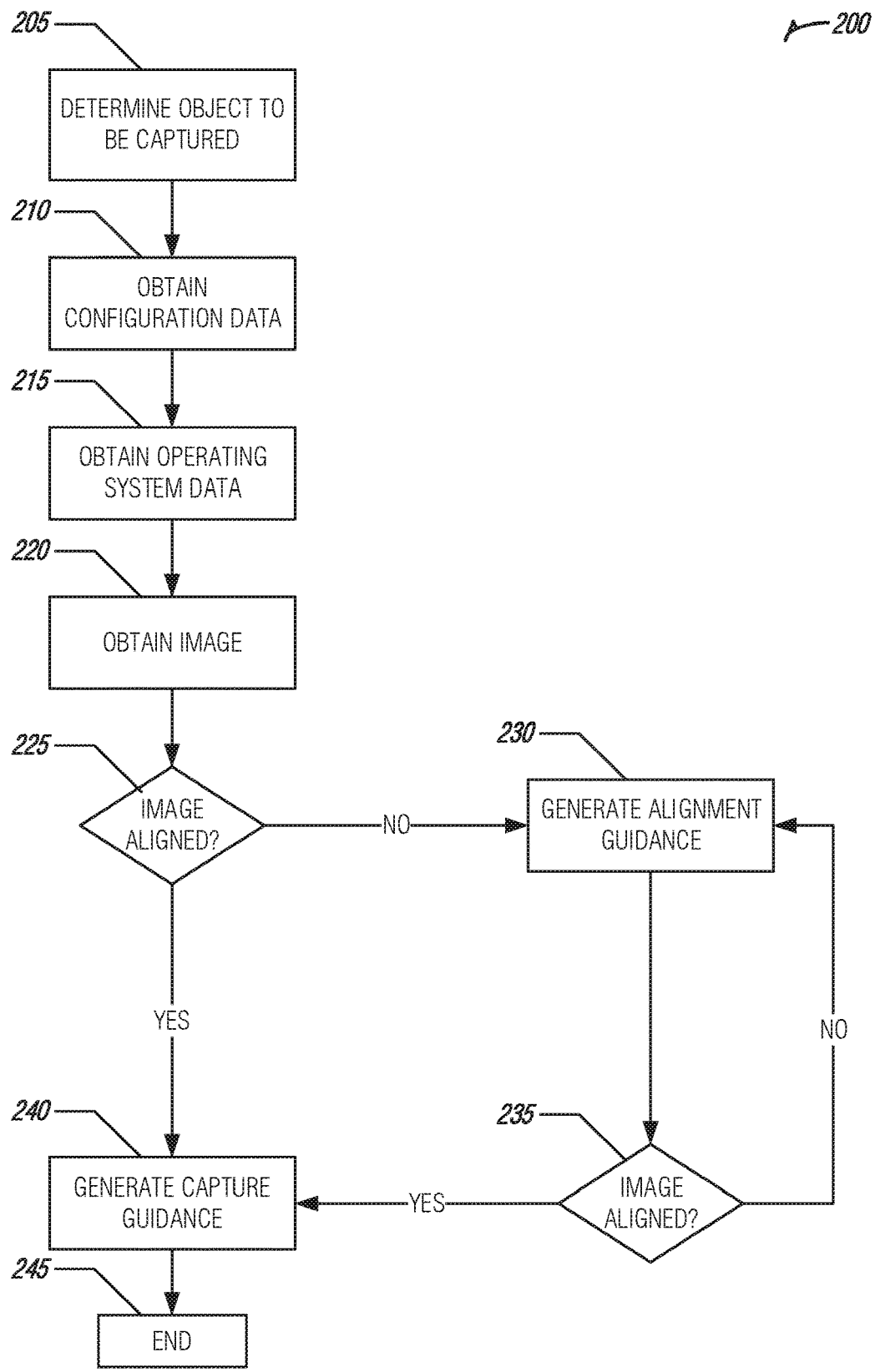
FIG. 2 illustrates a flow diagram of an example of a process for operating system integrated image capture guidance, according to an embodiment.

FIG. 2 illustrates a flow diagram of an example of a process 200 for operating system integrated image capture guidance, according to an embodiment. The process 200 may provide features as described in FIG. 1.

At operation 205, an object to be captured may be determined. For example, a check may be expected to be in an image to be captured for a check deposit.

At operation 210, configuration data may be obtained for the object. For example, an aspect ratio, document size, document color, document fields, etc. may be included in the configuration data.

At operation 215, operating system data may be obtained. For example, it may be determined what operating system is executing on a device being used to capture the image of the object. For example, operating system model and version information may be obtained. In an example, feature availability may be obtained that specifies features currently available from the device as indicated by the currently executing operating system.

At operation 220, an image may be obtained. In an example, the image may be obtained from an imaging sensor included with the device. In an example, the image may include a portion (or all) of the object.

At decision 225, it may be determined if the object is properly aligned in the image using the configuration data for the object. If not, alignment guidance is generated at operation 230. For example, the alignment guidance may be generated for output on an output device that is available via the device as indicated by the operating system data obtained at operation 215. In an example, the alignment guidance may be output as a visual overlay on the image, as audio, or as tactile output.

It is again determined if the object is properly aligned in the image at decision 235. If not, additional configuration guidance is generated at operation 230 until the object is properly aligned in the image.

When the image is determined to be aligned at decision 225 or decision 235, capture guidance is generated at operation 240. The capture guidance is generated using the operating system data obtained at operation 215. For example, an image capture shortcut may be obtained from the operating system data. For example, the shortcut may be a voice command the activates an image capture feature of the operating system upon utterance of the phrase "take picture." Upon image capture, the process 200 ends at operation 245.

Figure 3:
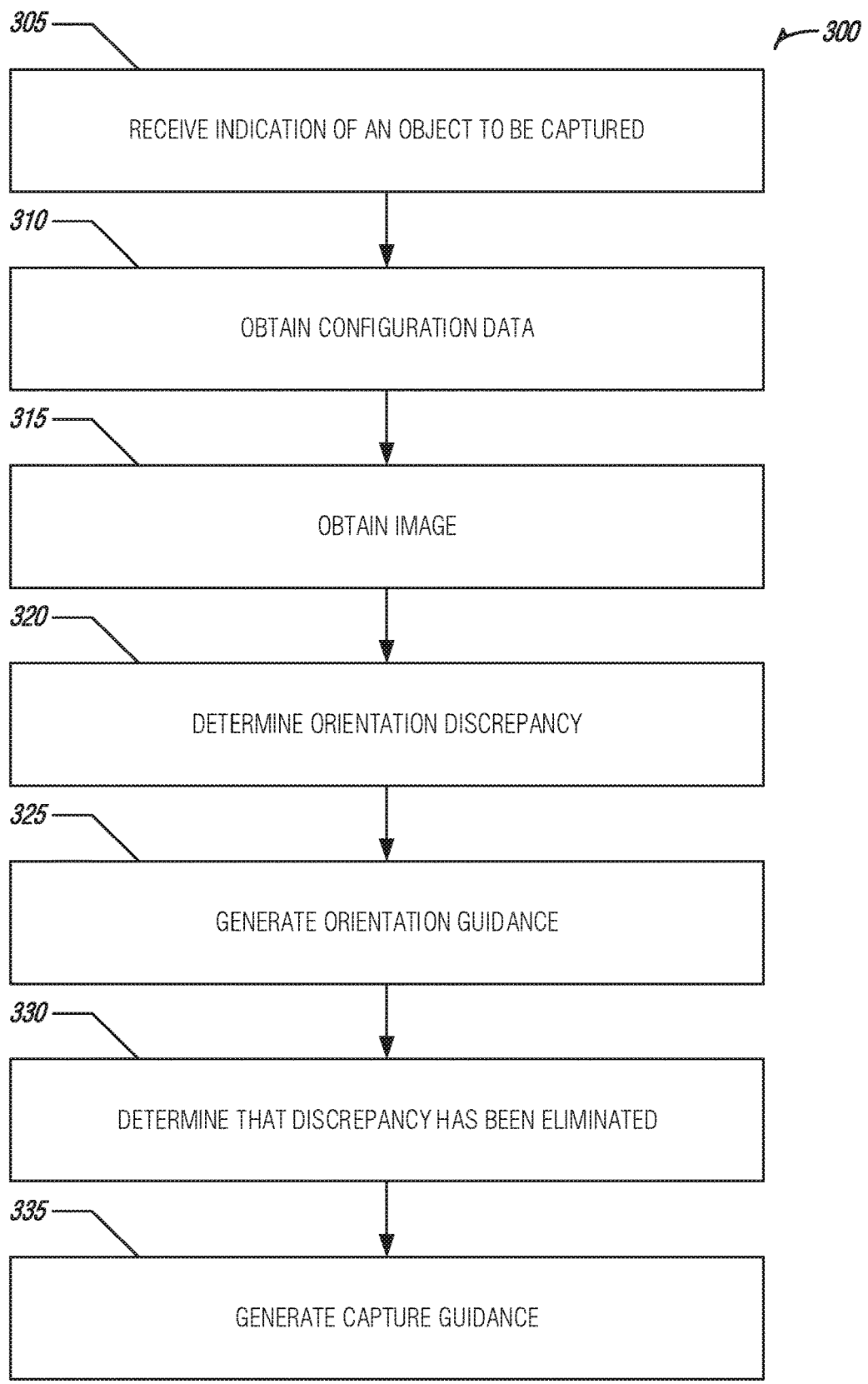
FIG. 3 illustrates an example of a method for operating system integrated image capture guidance, according to an embodiment.

FIG. 3 illustrates an example of a method 300 for operating system integrated image capture guidance, according to an embodiment. The method 400 may provide features as described in FIGS. 1 and 2.

At operation 305, an indication may be received of an object to be captured for completing a transaction. In an example, the indication of the object to be captured may be received from an application executed using the device.

At operation 310, configuration data may be obtained for an image of the object. The configuration data may indicate an orientation of the object in the image. In an example, the configuration data may include an aspect ratio of the object expected to be present in the image of the object.

At operation 315, an image of the object may be obtained from an imaging sensor of a device. At operation 320, a discrepancy may be determined between the orientation of the object in the image using the configuration data.

At operation 325, orientation guidance may be generated that indicates repositioning of the object in the image. In an example, the orientation guidance may output as a visual overlay on the image of the object displayed on a display device of the device. In another example, the orientation guidance may be output as audio transmitted to an audio output device of the device. In yet another example, the orientation guidance may be output as tactile feedback transmitted to a tactile output device of the device.

At operation 330, it may be determined that the discrepancy between the orientation of the object in the image has been eliminated. At operation 335, capture guidance may be generated for output via the device based on a set of commands determined based on detection of an operating system executing on the device. In an example, the capture guidance may include an indication of an operating specific voice command to activate image capture using the imaging sensor of the device. In an example, the set of commands may include an operating system specific voice command for activating capture of the image of the object.

In an example, a response to the capture guidance may be received. The response may be converted to operating specific computer commands and the operating system specific computer commands may be transmitted to the operating system executing on the device to effectuate capture of the image of the object.

Figure 4:
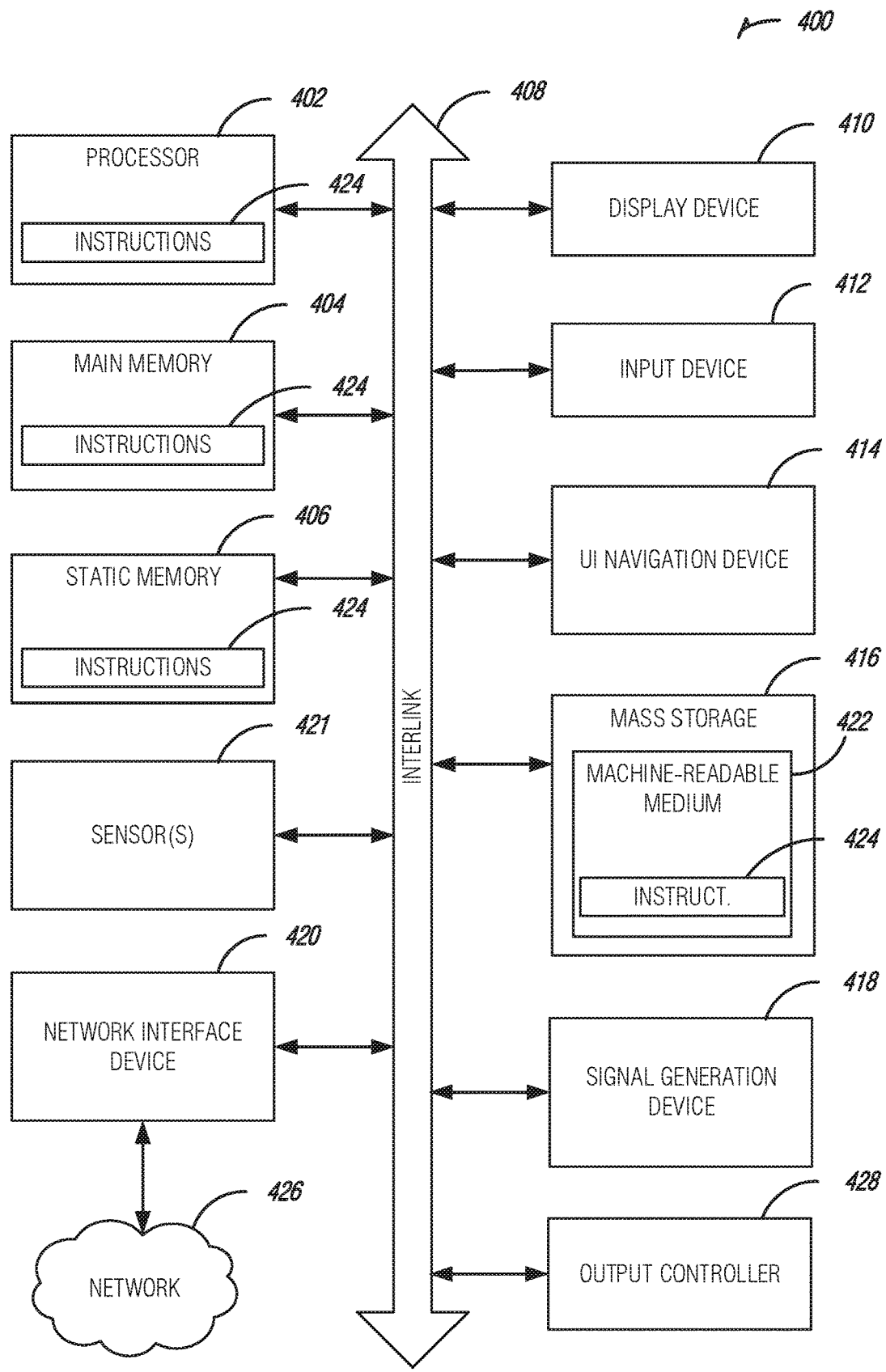
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensors. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for accessibility adapted image capture for transaction completion comprising:
    at least one processor; and
    memory including instructions that, when executed by the at least one processor, cause the at least one processor to perform operations to:
        identify an operating system of a device using an operating system identifier obtained from the device;
        determine an accessibility setting active on the device;
        receive an indication of an object to be captured by a device for completing a transaction;
        identify that the object is improperly aligned for capture via an imaging sensor of the device;
        select a set of operating system specific alignment feedback commands from a library of operating system specific feedback commands for respective operating systems using the accessibility setting and the operating system identifier; and
        generate alignment guidance for output via the device using the set of operating system specific alignment feedback commands.

2. The system of claim 1, wherein the indication of the object to be captured is received from an application executed using the device.

3. The system of claim 1, where the set of operating system specific alignment feedback commands include an operating system specific voice command selected based on the operating system identifier, wherein an operating system specific voice command is uttered by a user to activate image capture using the imaging sensor of the device.

4. The system of claim 1, the memory further comprising instructions that cause the at least one processor to perform operations to:
    receive a response to the alignment guidance;
    convert the response to operating system specific computer commands based on the operating system identifier; and
    transmit the operating system specific computer commands to the operating system executing on the device to effectuate capture of an image of the object.

5. The system of claim 1, the memory further comprising instructions that cause the at least one processor to perform operations to:
    generate the alignment guidance as an instruction to touch a button on a touch sensitive display of the device;
    detect activation of the button or an area of the touch sensitive display outside bounds of the button; and
    capture an image of the object.

6. The system of claim 1, the memory further comprising instructions that cause the at least one processor to perform operations to:
    obtain configuration data for an image of the object, the configuration data indicating orientation of the object in the image;
    obtain an image of the object from an imaging sensor of a device;
    determine a discrepancy between a current orientation of the object and the orientation of the object in the image defined in the configuration data;
    generate orientation guidance that indicates repositioning of the object in the image;
    output the orientation guidance to the device;
    in response to receipt of a repositioned image of the object, calculate a probability that the object is complete, as defined by the configuration data; and
    in response to a determination that the discrepancy between the orientation of the object in the image has been eliminated based on the probability, transmit the image to a transaction processing system.

7. The system of claim 6, wherein the orientation guidance is output as audio transmitted to an audio output device of the device.

8. A method for accessibility adapted image capture for transaction completion comprising:
    identifying an operating system of a device using an operating system identifier obtained from the device;
    determining an accessibility setting active on the device;
    receiving an indication of an object to be captured by a device for completing a transaction;
    identifying that the object is improperly aligned for capture via an imaging sensor of the device;
    selecting a set of operating system specific alignment feedback commands from a library of operating system specific feedback commands for respective operating systems using the accessibility setting and the operating system identifier; and
    generating alignment guidance for output via the device using the set of operating system specific alignment feedback commands.

9. The method of claim 8, wherein the indication of the object to be captured is received from an application executed using the device.

10. The method of claim 8, where the set of operating system specific alignment feedback commands include an operating system specific voice command selected based on the operating system identifier, wherein the operating system specific voice command is uttered by a user to activate image capture using the imaging sensor of the device.

11. The method of claim 8, further comprising:
    receiving a response to the alignment guidance;

converting the response to operating system specific computer commands based on the operating system identifier; and transmitting the operating system specific computer commands to the operating system executing on the device to effectuate capture of an image of the object.

12. The method of claim 8, further comprising:
generating the alignment guidance as an instruction to touch a button on a touch sensitive display of the device;
detecting activation of the button or an area of the touch sensitive display outside bounds of the button; and
capturing an image of the object.

13. The method of claim 8, further comprising:
obtaining configuration data for an image of the object, the configuration data indicating orientation of the object in the image;
obtaining an image of the object from an imaging sensor of a device;
determining a discrepancy between a current orientation of the object and the orientation of the object in the image defined in the configuration data;
generating orientation guidance that indicates repositioning of the object in the image;
outputting the orientation guidance to the device;
in response to receiving a repositioned image of the object, calculating a probability that the object is complete, as defined by the configuration data; and
in response to determining that the discrepancy between the orientation of the object in the image has been eliminated based on the probability, transmitting the image to a transaction processing system.

14. The method of claim 13, wherein the orientation guidance is output as audio transmitted to an audio output device of the device.

15. At least one non-transitory machine-readable medium including instructions for accessibility adapted image capture for transaction completion that, when executed by at least one processor, cause the at least one processor to perform operations to:
identify an operating system of a device using an operating system identifier obtained from the device;
determine an accessibility setting active on the device;
receive an indication of an object to be captured by a device for completing a transaction;
identify that the object is improperly aligned for capture via an imaging sensor of the device;
select a set of operating system specific alignment feedback commands from a library of operating system specific feedback commands for respective operating systems using the accessibility setting and the operating system identifier; and
generate alignment guidance for output via the device using the set of operating system specific alignment feedback commands.

16. The at least one non-transitory machine-readable medium of claim 15, wherein the indication of the object to be captured is received from an application executed using the device.

17. The at least one non-transitory machine-readable medium of claim 15, where the set of operating system specific alignment feedback commands include an operating system specific voice command selected based on the operating system identifier, wherein the operating system specific voice command is uttered by a user to activate image capture using an imaging sensor of the device.

18. The at least one non-transitory machine-readable medium of claim 15, further comprising instructions that cause the at least one processor to perform operations to:
receive a response to the alignment guidance;
convert the response to operating system specific computer commands based on the operating system identifier; and
transmit the operating system specific computer commands to the operating system executing on the device to effectuate capture of an image of the object.

19. The at least one non-transitory machine-readable medium of claim 15, further comprising instructions that cause the at least one processor to perform operations to:
generate the alignment guidance as an instruction to touch a button on a touch sensitive display of the device;
detect activation of the button or an area of the touch sensitive display outside bounds of the button; and
capture an image of the object.

20. The at least one non-transitory machine-readable medium of claim 15, further comprising instructions that cause the at least one processor to perform operations to:
obtain configuration data for an image of the object, the configuration data indicating orientation of the object in the image;
obtain an image of the object from an imaging sensor of a device;
determine a discrepancy between a current orientation of the object and the orientation of the object in the image defined in the configuration data;
generate orientation guidance that indicates repositioning of the object in the image;
output the orientation guidance to the device;
in response to receipt of a repositioned image of the object, calculate a probability that the object is complete, as defined by the configuration data; and
in response to a determination that the discrepancy between the orientation of the object in the image has been eliminated based on the probability, transmit the image to a transaction processing system.

* * * * *